(12) United States Patent
Pepi et al.

(10) Patent No.: US 6,422,812 B1
(45) Date of Patent: Jul. 23, 2002

(54) BOLTED JOINT FOR ROTOR DISKS AND METHOD OF REDUCING THERMAL GRADIENTS THEREIN

(75) Inventors: Jason Francis Pepi, Tewksbury; Brian Edward Dix, Ipswich; Tyler Frederick Hooper, Haverhill, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/747,873

(22) Filed: Dec. 22, 2000

(51) Int. Cl.$^7$ ................................................. F01D 5/08
(52) U.S. Cl. ...................... 415/115; 415/1; 416/96 R; 416/97 R; 416/198 A
(58) Field of Search .............................. 415/115, 135, 415/178, 189, 1; 416/95, 96 R, 198 A, 179, 97 R; 411/DIG. 2, 383, 347, 546, 999

(56) References Cited

U.S. PATENT DOCUMENTS

| | | | |
|---|---|---|---|
| 3,199,294 A | * | 8/1965 | Hagen ......................... 415/115 |
| 3,561,516 A | * | 2/1971 | Reddy ......................... 411/999 |
| 4,247,248 A | * | 1/1981 | Chaplin et al. ............. 415/136 |
| 4,309,145 A | * | 1/1982 | Viola ....................... 415/173.7 |
| 4,887,949 A | * | 12/1989 | Dimmick et al. ........... 411/999 |
| 4,991,390 A | * | 2/1991 | Shah .......................... 415/115 |
| 5,052,891 A | * | 10/1991 | Burkholder ............. 416/198 A |
| 5,072,785 A | * | 12/1991 | Dressler et al. ......... 411/DIG. 2 |
| 5,350,278 A | * | 9/1994 | Burge ..................... 416/198 A |
| 5,511,941 A | * | 4/1996 | Brandon .................. 415/214.1 |
| 5,848,874 A | * | 12/1998 | Heumann et al. ........... 415/189 |

* cited by examiner

Primary Examiner—R. Daniel Lopez
Assistant Examiner—Richard Woo
(74) Attorney, Agent, or Firm—Nathan D. Herkamp; Pierce Atwood

(57) ABSTRACT

Bolt hole stress in rotor disks having bolted joints is reduced by passing relatively hot secondary flow path air (such as compressor discharge air) through each bolt hole to heat the disk from inside the bolt hole. In doing so, the temperature distribution in the area of the bolt hole is made more uniform and the stress is dramatically reduced. The bolted joint includes a bolt hole formed in a first rotor disk and a bolt disposed in the bolt hole such that a channel is defined between the bolt and the bolt hole. A first nut or abutment is attached to a first end of the bolt, and a second nut or abutment is attached to a second end of the bolt. A first passage associated with the first abutment provides fluid communication with the channel, and a second passage associated with the second abutment provides fluid communication with the channel, thereby allowing the relatively hot fluid to pass through the channel during engine operation.

16 Claims, 3 Drawing Sheets

BOLTED JOINT FOR ROTOR DISKS AND METHOD OF REDUCING THERMAL GRADIENTS THEREIN

BACKGROUND OF THE INVENTION

This invention relates generally to gas turbine engines and more particularly to bolted joints for joining adjacent rotor disks in such engines.

A gas turbine engine includes a compressor that provides pressurized air to a combustor wherein the air is mixed with fuel and the mixture is ignited for generating hot combustion gases. These gases flow downstream to one or more turbines that extract energy therefrom to drive the compressor and provide useful work such as powering an aircraft in flight. The compressor and turbine sections each include a plurality of rotor disks that are joined together for rotation about the engine's centerline axis. Each rotor disk comprises a central bore region, a disk rim from which a plurality of radially extending blades are supported, and a web joining the bore and rim. The bore and web are typically much more massive than the disk rim to accommodate the stresses to which the disk is subjected.

Rotating disks, particularly those in the high pressure turbine section of an engine, develop high radial thermal gradients during transient operation because of exposure of the disk rim to hot gases. In this case, the rim of the disk has a quick thermal response (i.e., temperature increase) while the web and bore react more slowly due to their high relative mass and their lower temperature environment. The thermal gradient creates large tangential and radial stresses in the web and bore of the disk that are magnified by any stress concentrations such as holes, fillets and the like.

A significant challenge in disk design is to connect multiple disks together without developing high stresses. One method of connection is through the use of bolted joints connecting adjacent disks. Often, at least one of the disks must be bolted through the disk web because of space limitations. In such instances, the bolt holes are located in regions of high thermal gradient and produce high concentrated stresses. This limits the allowable time of operation of the rotor hardware.

One approach to reducing bolt hole stress is to balance the radial and tangential stresses by modifying the hole pattern design, i.e., the number of holes, hole spacing, hole diameter and hole length. Generally, a bolted joint having more holes will produce lower mechanical stresses in the tangential direction but will result in higher radial stress. For every hole pattern design, there exists a certain quantity of holes that will balance the tangential stress at the top or bottom of the hole with the radial stress at the sides of the hole. However, modifying the hole pattern design to balance the radial and tangential stresses typically results in increased disk weight and even slower transient thermal response of the disk web and bore. Accordingly, there is a need for an improved method of reducing bolt hole stresses.

BRIEF SUMMARY OF THE INVENTION

The above-mentioned need is met by the present invention, which provides a bolted joint for connecting first and second rotor disks in a gas turbine engine. The bolted joint includes a bolt hole formed in the first rotor disk and a bolt disposed in the bolt hole such that a channel is defined between the bolt and the bolt hole. A first abutment is attached to a first end of the bolt, and a second abutment is attached to a second end of the bolt. A first passage associated with the first abutment provides fluid communication with the channel, and a second passage associated with the second abutment provides fluid communication with the channel. Hot fluid passing through the channel reduces thermal gradients in the first rotor disk.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
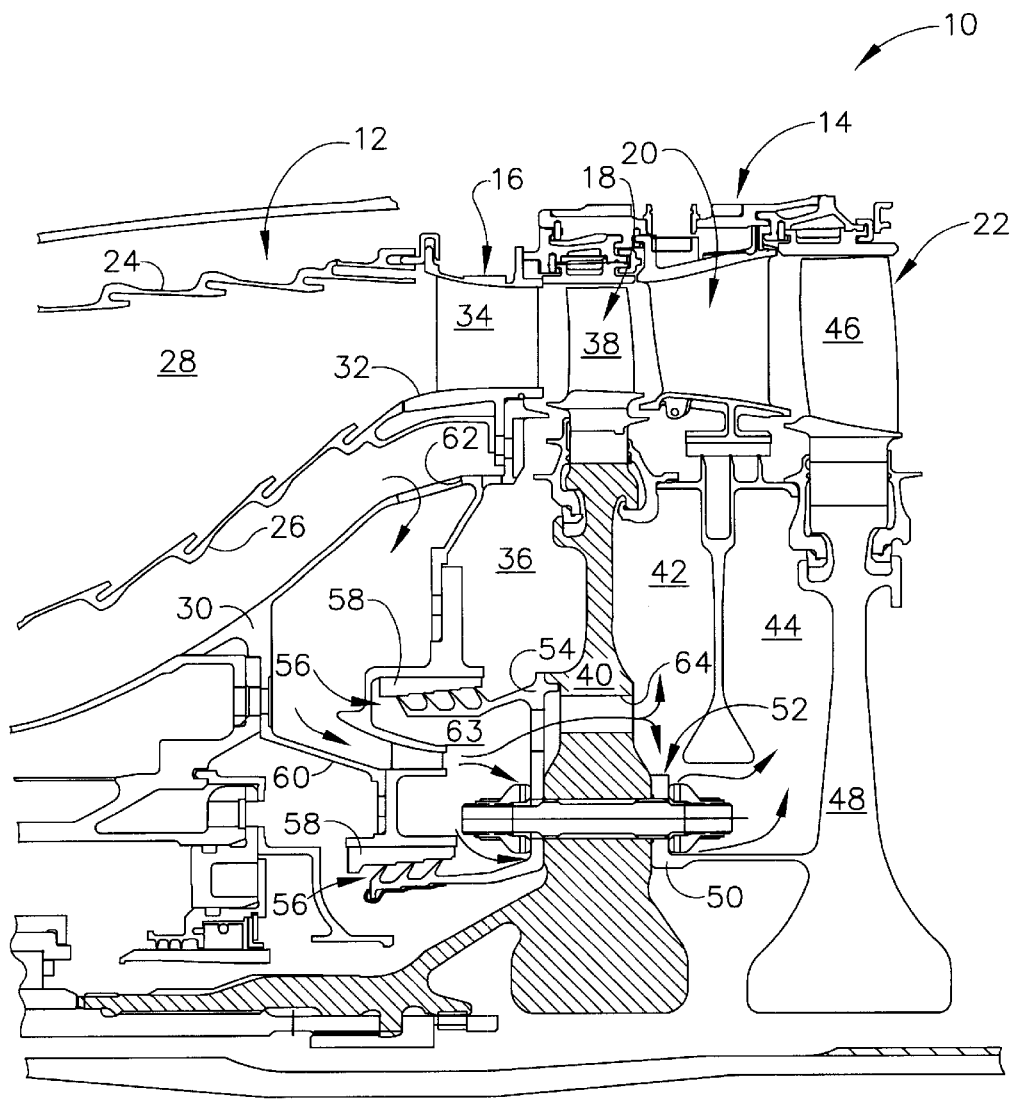
FIG. 1 is a partial cross-sectional view of a gas turbine engine having the bolted joint of the present invention.

Referring to the drawings wherein identical reference numerals denote the same elements throughout the various views, FIG. 1 shows a portion of a gas turbine engine 10 having, among other structures, a combustor 12 and a turbine section 14 located downstream of the combustor 12. The turbine section 14 includes a first stage nozzle assembly 16, a first stage turbine rotor 18, a second stage nozzle assembly 20 and a second stage turbine rotor 22 arrange sequentially along the engine centerline axis. The combustor 12 includes a generally annular hollow body having an outer liner 24 and an inner liner 26 defining a combustion chamber 28 therein. A compressor (not shown) provides compressed air that passes primarily into the combustor 12 to support combustion and partially around the combustor 12 where it is used to cool both the combustor liners 24, 26 and turbomachinery further downstream. Fuel is introduced into the forward end of the combustor 12 and is mixed with the air in a conventional fashion. The resulting fuel-air mixture flows into the combustion chamber 28 where it is ignited for generating hot combustion gases. The hot combustion gases are discharged to the turbine section 14 where they are expanded so that energy is extracted.

The first stage nozzle assembly 16 includes an inner nozzle support 30 to which a plurality of circumferentially adjoining nozzle segments 32 is mounted. The nozzle segments 32 collectively form a complete 360° C. assembly. Each segment 32 has two or more circumferentially spaced vanes 34 (one shown in FIG. 1) over which the combustion gases flow. The vanes 34 are configured so as to optimally direct the combustion gases to the first stage turbine rotor 18. The inner nozzle support 30 is a stationary member suitably supported in the engine 10.

The first stage turbine rotor 18 is located aft of the first stage nozzle assembly 16 and is spaced axially therefrom so as to define a first wheel cavity 36. The first stage turbine rotor 18 includes a plurality of turbine blades 38 (one shown in FIG. 1) suitably mounted to a first rotor disk 40 and radially extending into the turbine flow path. The second stage nozzle assembly 20 is located aft of the first stage turbine rotor 18, and the second stage turbine rotor 22 is located aft of the second stage nozzle assembly 20 so as to define second and third wheel cavities 42 and 44, respectively. The second stage turbine rotor 22 includes a plurality of turbine blades 46 (one shown in FIG. 1) suitably mounted to a second rotor disk 48 and radially extending into the turbine flow path. The second rotor disk 48 has a forward extending flange 50 that is joined to the aft side of the first rotor disk 40 at a bolted joint 52. Thus, the first and second rotor disks 40, 48 are arranged to rotate together about the engine centerline axis.

An annular rotating seal member 54 is fixed to the forward side of the first rotor disk 40 for rotation therewith by the bolted joint 52. The rotating seal member 54 contacts the inner nozzle support 30 to form one or more forward seals 56 for sealing the compressor discharge air that is bled off for cooling purposes from the hot gases in the turbine flow path. In one preferred embodiment, the forward seals 56 are rotating labyrinth seals, each including a plurality of thin, tooth-like projections extending radially outward from the stationary seal member 56. The outer circumference of each projection rotates within a small tolerance of the inner circumference of a corresponding annular stationary seal member 58 mounted on the inner nozzle support 30, thereby effecting sealing between the cooling air and the hot gases in the turbine flow path.

The nozzle assembly 16 also includes an accelerator 60 disposed radially between the two forward seals 56. The accelerator 60 is an annular member that defines an internal air plenum. High pressure compressor discharge air is fed to the accelerator 60 via air holes 62 formed in the inner nozzle support 30. The high pressure air passes axially through the accelerator 60 and is discharged therefrom through a plurality of aft nozzles into a chamber or cavity 63 located forward of the first rotor disk 40. A portion of this air passes through passages 64 formed in the first rotor disk 40 for cooling turbomachinery further downstream. As will be described in more detail below, some of this high pressure air is directed through the bolted joint 52 for reducing the thermal gradient in the first rotor disk 40 and thereby reducing disk transient stresses.

Figure 2:
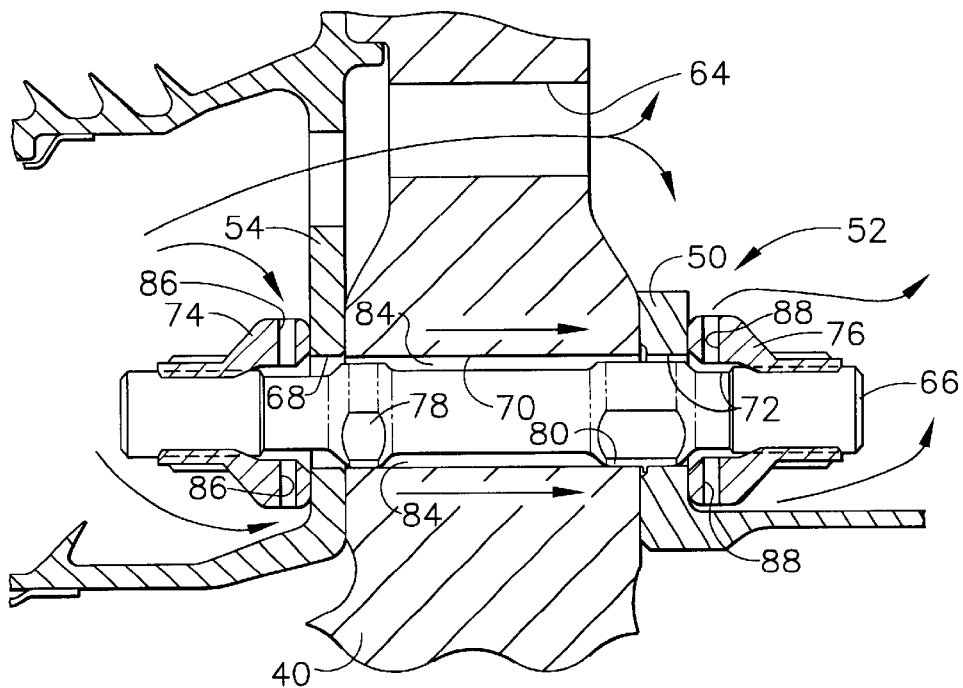
FIG. 2 is an enlarged cross-sectional view of the bolted joint of FIG. 1.
Figure 3:
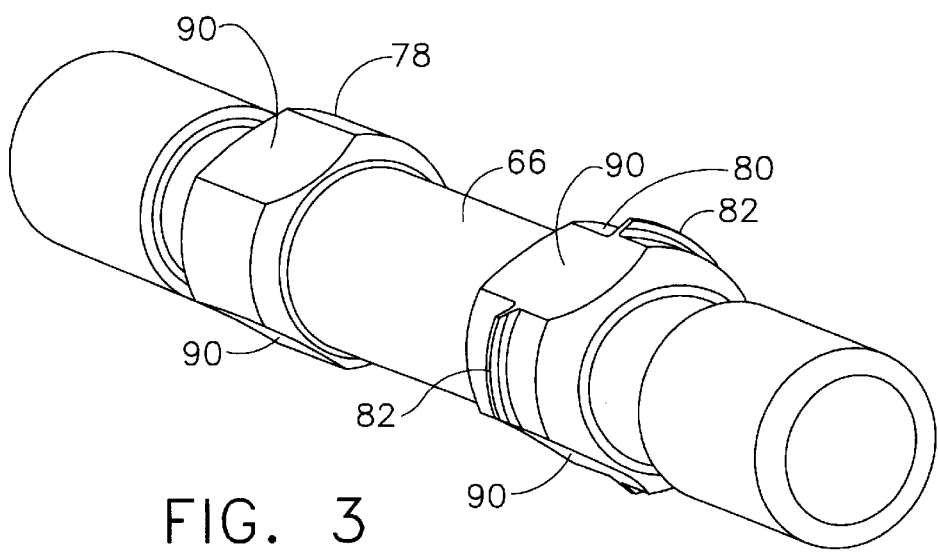
FIG. 3 is a perspective view of the bolt from the bolted joint of FIG. 1.

Referring now to FIGS. 2 and 3, the bolted joint 52 is described in more detail. The bolted joint 52 comprises a bolt 66 extending axially through a first opening 68 in the rotating seal member 54, a bolt hole 70 in the first rotor disk 40, and a second opening 72 in the second rotor disk flange 50. Both ends of the bolt 66 are threaded so that a first nut 74 is threadingly received on the forward end of the bolt 66 and a second nut 76 is threadingly received on the aft end of the bolt 66. The first nut 74 is a fixed abutment against the rotating seal member 54, and the second nut 76 is a fixed abutment against the second rotor disk flange 50. Thus, when the nuts 74, 76 are suitably tightened, the first rotor disk 40, the second rotor disk 48 and the rotating seal member 54 are joined together for rotation about the engine centerline axis.

The bolt 66 includes first and second raised shoulders 78 and 80, respectively, that are located intermediate the threaded ends thereof. The raised shoulders 78, 80 are sized to fit within the bolt hole 70 and the second opening 72 with a tight tolerance such that the bolted joint 52 provides a body-bound function. That is, the bolted joint 52 will radially locate and maintain the second rotor disk 48 with respect to the first rotor disk 40. The second, or aft, raised shoulder 80 has an axial retention lip 82 formed on the outer circumference thereof. The axial retention lip 82 abuts a recess formed in the forward face of the second rotor disk flange 50, thereby axially locating the bolt 66 with respect to the first and second rotor disks 40, 48. This facilitates assembly of the bolted joint 52, which is normally a blind assembly.

The bolt 66 is sized so as to have an annular, axially extending channel 84 formed thereabout. Specifically, except for the raised shoulders 78, 80, the bolt 66 has a lesser diameter than its surrounding structure; i.e., the bore of the first nut 74, the first opening 68, the bolt hole 70, the second opening 72 and the bore of the second nut 76. Accordingly, the channel 84 is defined by the gap between the bolt 66 and its surrounding structure.

One or more radial inlet passages 86 are formed in the first nut 74 for providing fluid communication between the forward cavity 63 and the channel 84. Similarly, one or more radial outlet passages 88 are formed in the second nut 76 for providing fluid communication between the second and third wheel cavities 42, 44 and the channel 84. As best seen in FIG. 3, each of the raised shoulders 78, 80 has a plurality of axially extending flats 90 formed thereon. The flats 90 allow air to flow down the entire length of the channel 84, while the rest of the raised shoulders 78, 80 engage the inner surfaces of the bolt hole 70 and the second opening 72 to perform the body-bound function.

In operation, compressor discharge air delivered to the forward cavity 63 from the accelerator 60 flows through the inlet passages 86 in the first nut 74 into the forward end of the channel 84. This air passes through the bolt hole portion of the channel 84 due to the pressure differential between the forward cavity 63 and the second and third wheel cavities 42, 44. The air is then discharged through the outlet passages 88 to the second and third wheel cavities 42, 44 where it rejoins the compressor discharge air that has passed through the passages 64 and contributes to cooling turbomachinery further downstream. As the compressor discharge air (which is generally hotter than the web and core of the first rotor disk 40) flows through the bolt hole portion of the channel 84, it heats the first rotor disk 40 in the area around the bolt hole 70. By heating the first rotor disk 40, the compressor discharge air increases the thermal response of the disk's web and bore, thereby decreasing the thermal gradient between the web and bore and the disk's rim. This reduction in thermal gradient will cause a reduction in unconcentrated thermal operating stresses and result in increased hardware life. The amount of air delivered to the bolt hole 70 is determined by the size of the inlet and outlet passages 86, 88 and/or the size of the shoulder flats 90. Thus, the amount of air needed to produce the desired degree of disk heating for a given system can be achieved by tightly controlling the sizes of the inlet and outlet passages 86, 88 and the shoulder flats 90.

Figure 4:
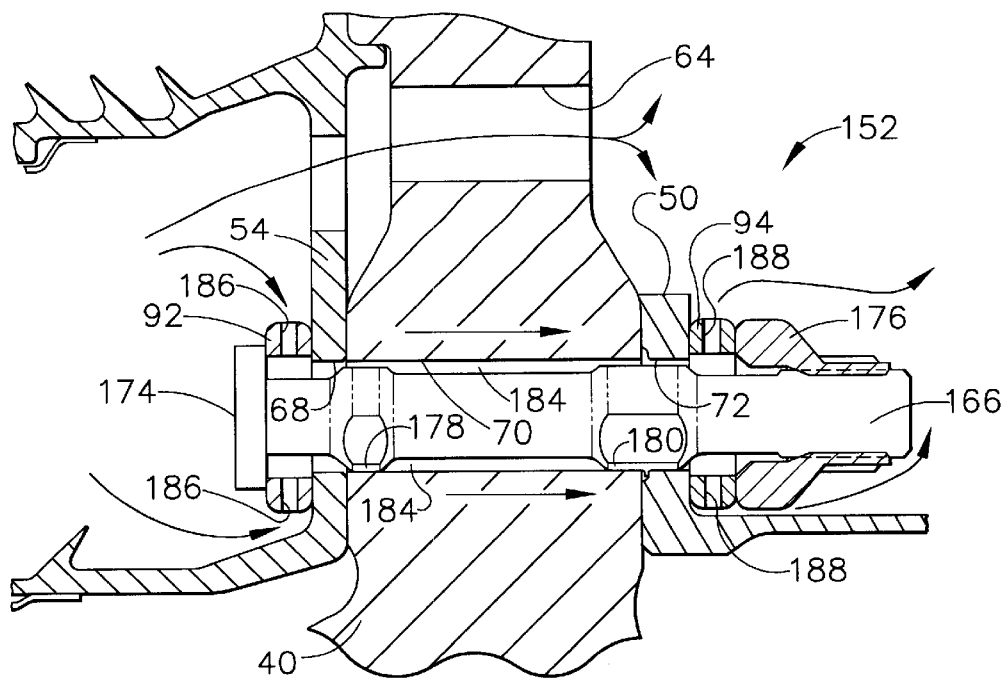
FIG. 4 is an enlarged cross-sectional view of a second embodiment of a bolted joint.

Turning to FIG. 4, a second embodiment of a bolted joint 152 is shown. The bolted joint 152 of the second embodiment comprises a bolt 166 extending axially through a first opening 68 in the rotating seal member 54, a bolt hole 70 in the first rotor disk 40, and a second opening 72 in the second rotor disk flange 50. The forward end of the bolt 166 has a head 174 integrally formed thereon, and the aft end of the bolt 166 is threaded so that a nut 176 is threadingly received thereon. A first washer or spacer 92 is disposed on the bolt 166 between the head 174 and the rotating seal member 54, and a second washer or spacer 94 is disposed on the bolt 166 between the nut 176 and the second rotor disk flange 50. The head 174 and first spacer 92 act as a fixed abutment against the rotating seal member 54, and the nut 176 and second spacer 94 act as a fixed abutment against the second rotor disk flange 50. Thus, when the nut 176 is suitably tightened, the first rotor disk 40, the second rotor disk 48 and the rotating seal member 54 are joined together for rotation about the engine centerline axis. Alternatively, two threaded nuts could be used (like in the first embodiment) instead of the integral head and single nut.

The bolt 166 includes first and second raised shoulders 178 and 180, respectively. As in the first embodiment, the raised shoulders 178, 180 are sized to fit within the bolt hole 70 and the second opening 72 with a tight tolerance such that the bolted joint 152 provides a body-bound function and have axially extending flats formed thereon. Also like the first embodiment, the bolt 166 is sized so as to have an annular, axially extending channel 184 formed thereabout. Specifically, except for the raised shoulders 178, 180, the bolt 166 has a lesser diameter than its surrounding structure; i.e., the first spacer 92, the first opening 68, the bolt hole 70, the second opening 72 and the second spacer 94. Accordingly, the channel 184 is defined by the gap between the bolt 166 and its surrounding structure.

One or more radial inlet passages 186 are formed in the first spacer 92 for providing fluid communication between the forward cavity 63 and the channel 184. Similarly, one or more radial outlet passages 188 are formed in the second spacer 94 for providing fluid communication between the second and third wheel cavities 42, 44 and the channel 184. Thus, compressor discharge air will flow into the channel 184 through the inlet passages 186 and out of the channel 184 through the outlet passages 188. The compressor discharge air will heat the first rotor disk 40 in the area around the bolt hole 70 as it flows through the bolt hole portion of the channel 184.

Figure 5:
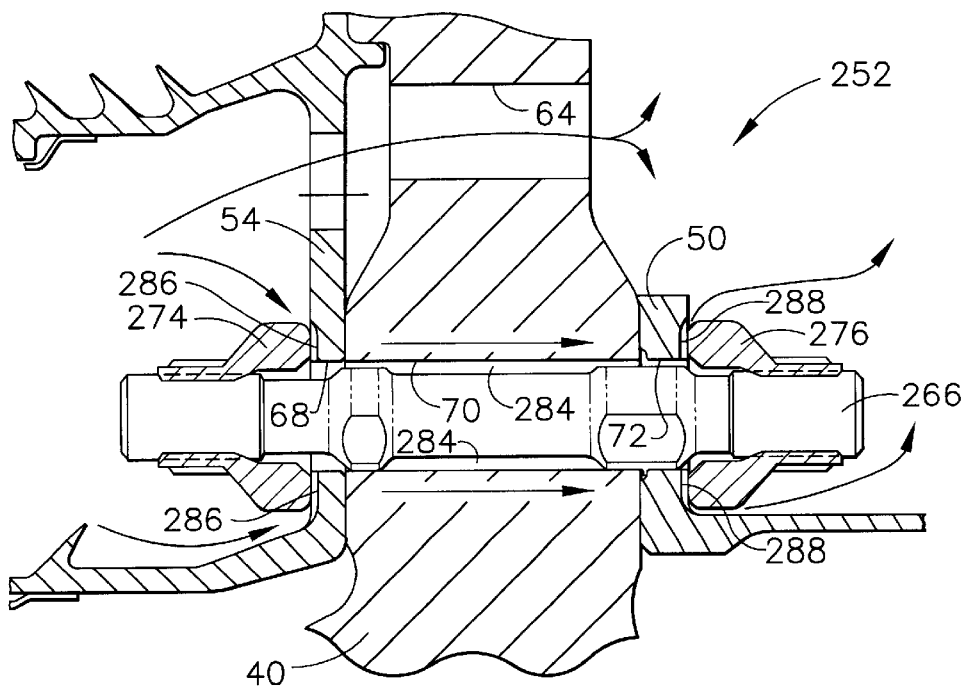
FIG. 5 is an enlarged cross-sectional view of a third embodiment of a bolted joint.

Turning to FIG. 5, a third embodiment of a bolted joint 252 is shown. The bolted joint 252 of the third embodiment comprises a bolt 266 extending axially through a first opening 68 in the rotating seal member 54, a bolt hole 70 in the first rotor disk 40, and a second opening 72 in the second rotor disk flange 50.

Both ends of the bolt 266 are threaded so that a first nut 274 is threadingly received on the forward end of the bolt 266 and a second nut 276 is threadingly received on the aft end of the bolt 266 for joining the first rotor disk 40, the second rotor disk 48 and the rotating seal member 54. As with the prior embodiments, the bolt 266 is sized so as to have an annular, axially extending channel 284 formed thereabout. However, in this embodiment, inlet and outlet passages for the channel 284 are not formed in nuts or spacers. Instead, one or more grooves or slots 286 are formed in the forward surface of the rotating seal member 54, adjacent to the first nut 274. Thus, the first nut 274 and the slots 286 define inlet passages that provide fluid communication between the forward cavity 63 and the channel 284. Similarly, one or more grooves or slots 288 are formed in the aft surface of the second rotor disk flange 50, adjacent to the second nut 276. Thus, the second nut 276 and the slots 288 define outlet passages that provide fluid communication between the second and third wheel cavities 42, 44 and the channel 284. Compressor discharge air will thus flow into the channel 284 through the inlet slots 286 and out of the channel 284 through the outlet slots 288. The compressor discharge air will heat the first rotor disk 40 in the area around the bolt hole 70 as it flows through the bolt hole portion of the channel 284. This embodiment can be implemented with or without spacers and with a bolt having an integral head and a single nut as an alternative to the two threaded nuts 274, 276, as shown. While this third embodiment will simplify the manufacture of the fasteners and possibly reduce overall part count, it could also result in increased stress concentrations in the structural rotor components.

The foregoing has described a bolted joint that increases the thermal response of the disk web and bore through use of a parallel air delivery system. The increased thermal response reduces the thermal gradient in the rotor disk, which in turn reduces disk transient stresses. While specific embodiments of the present invention have been described, it will be apparent to those skilled in the art that various modifications thereto can be made without departing from the spirit and scope of the invention as defined in the appended claims.

What is claimed is:

1. A bolted joint for connecting first and second components, said bolted joint comprising:

a bolt hole formed in said first component;

a bolt disposed in said bolt hole, wherein a channel is defined between said bolt and said bolt hole, said bolt having at least one raised shoulder formed thereon for engaging said bolt hole, said raised shoulder having means for allowing fluid passage through said channel;

a first abutment attached to a first end of said bolt, said first abutment defining a first passage in fluid communication with said channel; and a second abutment attached to a second end of said bolt, said second abutment defining a second passage in fluid communication with said channel.

2. The bolted joint of claim 1 wherein said first abutment comprises a first nut threadingly received on said first end of said bolt, said first passage being formed in said first nut, and said second abutment comprises a second nut threadingly received on said second end of said bolt, said second passage being formed in said second nut.

3. The bolted joint of claim 1 wherein said first abutment comprises a head integrally formed on said first end of said bolt and a first spacer disposed on said bolt adjacent to said head, said first passage being formed in said first spacer, and said second abutment comprises a nut threadingly received on said second end of said bolt and a second spacer disposed on said bolt adjacent to said nut, said second passage being formed in said second spacer.

4. The bolted joint of claim 1 wherein said first abutment comprises a first nut threadingly received on said first end of said bolt and a first spacer disposed on said bolt adjacent to said first nut, said first passage being formed in said first spacer, and said second abutment comprises a second nut threadingly received on said second end of said bolt and a second spacer disposed on said bolt adjacent to said second nut, said second passage being formed in said second spacer.

5. The bolted joint of claim 1 wherein said first passage comprises a first groove formed in bolted structure adjacent to said first abutment and said second passage comprises a second groove formed in bolted structure adjacent to said second abutment.

6. The bolted joint of claim 1 wherein said means for allowing fluid passage through said channel comprise at least one flat formed on said raised shoulder of said bolt.

7. The bolted joint of claim 1 further comprising a retention lip formed on said bolt and abutting said second component.

8. In a gas turbine engine comprising a first rotor disk, a second rotor disk, a first cavity adjacent to said first rotor disk, and a second cavity adjacent to said second rotor disk, a bolted joint for connecting said first and second rotor disks, said bolted joint comprising:

a bolt hole formed in said first rotor disk;

a bolt disposed in said bolt hole, wherein a channel is defined between said bolt and said bolt hole;

a first abutment attached to a first end of said bolt;

a second abutment attached to a second end of said bolt;

a first passage providing fluid communication between said first cavity and said channel; and a second passage providing fluid communication between said second cavity and said channel.

9. The bolted joint of claim 8 wherein said first abutment comprises a first nut threadingly received on said first end of said bolt, said first passage being formed in said first nut, and said second abutment comprises a second nut threadingly received on said second end of said bolt, said second passage being formed in said second nut.

10. The bolted joint of claim 8 wherein said first abutment comprises a head integrally formed on said first end of said bolt and a first spacer disposed on said bolt adjacent to said head, said first passage being formed in said first spacer, and said second abutment comprises a nut threadingly received on said second end of said bolt and a second spacer disposed on said bolt adjacent to said nut, said second passage being formed in said second spacer.

11. The bolted joint of claim 8 wherein said first abutment comprises a first nut threadingly received on said first end of said bolt and a first spacer disposed on said bolt adjacent to said first nut, said first passage being formed in said first spacer, and said second abutment comprises a second nut threadingly received on said second end of said bolt and a second spacer disposed on said bolt adjacent to said second nut, said second passage being formed in said second spacer.

12. The bolted joint of claim 8 wherein said first passage comprises a first groove formed in bolted structure adjacent to said first abutment and said second passage comprises a second groove formed in bolted structure adjacent to said second abutment.

13. The bolted joint of claim 8 wherein said bolt has at least one raised shoulder formed thereon for engaging said bolt hole, said raised shoulder having at least one flat formed thereon for allowing fluid passage through said channel.

14. The bolted joint of claim 8 further comprising a retention lip formed on said bolt and abutting said second rotor disk.

15. In a gas turbine engine having a bolted joint for connecting a first rotor disk and a second rotor disk wherein said bolted joint includes a bolt disposed in a bolt hole formed in said first rotor disk, a method of reducing thermal gradients in said first rotor disk comprising:

providing a channel between said bolt and said bolt hole; and causing a fluid to pass through said channel, wherein said fluid is hotter than a surrounding portion of said first rotor disk.

16. The method of claim 15 wherein said fluid is compressor discharge air.

* * * * *